(12) United States Patent
Anderson et al.

(10) Patent No.: US 10,401,229 B2
(45) Date of Patent: Sep. 3, 2019

(54) SYSTEMS AND METHODS FOR ICING RESISTANT TOTAL AIR TEMPERATURE PROBES

(71) Applicant: Honeywell International Inc., Morris Plains, NJ (US)

(72) Inventors: Morris G. Anderson, Mesa, AZ (US); Grant A. Gordon, Peoria, AZ (US); Michael Albert McPherson, Phoenix, AZ (US)

(73) Assignee: Honeywell International Inc., Morris Plains, NJ (US)

( * ) Notice: Subject to any disclaimer, the term of this patent is extended or adjusted under 35 U.S.C. 154(b) by 138 days.

(21) Appl. No.: 15/359,442

(22) Filed: Nov. 22, 2016

(65) Prior Publication Data
US 2018/0143082 A1 May 24, 2018

(51) Int. Cl.
  *G01K 13/00* (2006.01)
  *G01K 1/08* (2006.01)
  (Continued)

(52) U.S. Cl.
  CPC ............. *G01K 1/08* (2013.01); *G01K 13/028* (2013.01); *B64D 43/00* (2013.01)

(58) Field of Classification Search
  CPC combination set(s) only.
  See application file for complete search history.

(56) References Cited

U.S. PATENT DOCUMENTS

| 2,588,840 A | 3/1952 | Howland |
| 2,928,279 A | 3/1960 | Schober |

(Continued)

FOREIGN PATENT DOCUMENTS

| EP | 1586877 A1 | 10/2005 |
| EP | 1837636 B1 | 5/2012 |

(Continued)

OTHER PUBLICATIONS

"Temperature & Thermocouple Probes", "retrieved Oct. 5, 2016 from http://www.unitedsensorcorp.com/temperature.html", 2015, pp. 1-2.

(Continued)

*Primary Examiner* — Lisa M Caputo
*Assistant Examiner* — Nasir U. Ahmed
(74) *Attorney, Agent, or Firm* — Fogg & Powers LLC

(57) ABSTRACT

Systems and methods for icing resistant total air temperature probes are provided. In one embodiment, a total air temperature data probe comprises: a probe base; a probe body comprising: a first interior airflow passage comprising a first annulus; a temperature sensor positioned within the first annulus; a heating element; a notched intake port positioned at a distal end, wherein the probe body provides a conductive thermal path from the heating element to the intake port, the intake port including an open channel extending inward into an intake aperture of the probe body, and a cutaway region that defines a recessed second face inset from the first face and exposes the open channel at least partially from the leading edge. The notched intake port further comprises a slot inset from the recessed second face that traverses across at least a portion of the intake aperture perpendicularly to the open channel.

16 Claims, 5 Drawing Sheets

(51) Int. Cl.
*G01K 13/02* (2006.01)
*B64D 43/00* (2006.01)

(56) References Cited

U.S. PATENT DOCUMENTS

| | | |
|---|---|---|
| 2,970,475 A | 2/1961 | Werner |
| 3,170,328 A | 2/1965 | Werner et al. |
| 5,653,538 A | 8/1997 | Phillips |
| 6,076,963 A | 6/2000 | Menzies et al. |
| 6,609,825 B2 | 3/2003 | Ice et al. |
| 6,702,233 B1 | 3/2004 | Dupont |
| 7,174,782 B2 | 2/2007 | Ice |
| 7,328,623 B2 | 2/2008 | Slagle et al. |
| 7,357,572 B2 | 4/2008 | Benning et al. |
| 7,441,948 B2 | 10/2008 | Bernard et al. |
| 7,984,647 B2 | 7/2011 | Severson et al. |
| 8,104,955 B2 | 1/2012 | Benning et al. |
| 8,806,934 B2 | 8/2014 | Goedel |
| 8,864,370 B2 | 10/2014 | Dijon et al. |
| 9,243,963 B2 | 1/2016 | Thorpe et al. |
| 9,429,481 B2 | 8/2016 | Agami |
| 2003/0005779 A1 | 1/2003 | Bernard |
| 2004/0017763 A1 | 1/2004 | Tawa et al. |
| 2005/0066722 A1* | 3/2005 | Magnin .......... G01D 11/30 73/170.02 |
| 2006/0056489 A1* | 3/2006 | Bernard .......... G01K 13/02 374/208 |
| 2007/0220984 A1 | 9/2007 | Slagle et al. |
| 2008/0285620 A1 | 11/2008 | Benning et al. |
| 2009/0154522 A1 | 6/2009 | Kulczyk |
| 2013/0022076 A1* | 1/2013 | Dijon .............. G01K 13/02 374/138 |
| 2014/0064330 A1 | 3/2014 | Agami |
| 2014/0169403 A1 | 6/2014 | Nakamura |
| 2015/0063414 A1 | 3/2015 | Wigen et al. |
| 2015/0103863 A1* | 4/2015 | Herman .......... G01K 13/028 374/138 |
| 2016/0238456 A1 | 8/2016 | Wigen |
| 2018/0188118 A1 | 7/2018 | Anderson et al. |
| 2018/0313698 A1 | 11/2018 | Anderson et al. |

FOREIGN PATENT DOCUMENTS

| | | |
|---|---|---|
| EP | 2863195 | 4/2015 |
| EP | 2863195 A1 | 4/2015 |
| EP | 2866011 A3 | 6/2015 |
| EP | 3056884 A1 | 8/2016 |

OTHER PUBLICATIONS

European Patent Office; "Extended European Search Report from EP Application No. 17201974.7 dated Apr. 9, 2018"; from Foreign Counterpart of U.S. Appl. No. 15/359,442 dated Apr. 9, 2018; pp. 1-9; Published: EP.

European Patent Office; "Extended European Search Report from EP Application No. 18150116.4 dated Apr. 26, 2018"; from Foreign Counterpart of U.S. Appl. No. 15/399,611; dated Apr. 26, 2018; pp. 1-5; Published: EP.

U.S. Patent and Trademark Office, "Restriction Requirement from U.S. Appl. No. 15/399,611 dated Aug. 27, 2018", pp. 1-5, Published in U.S.

European Patent Office, "Extended European Search Report from EP Application No. 18169377.1 dated Sep. 26, 2018", "from Foreign Counterpart of U.S. Appl. No. 15/583,799", dated Sep. 26, 2018, ppp. 1-8, Published in: EP.

U.S. Patent and Trademark Office, Notice of Allowance for U.S. Appl. No. 15/399,611 dated Oct. 22, 2018. pp. 1-17, Published in: US.

U.S. Patent and Trademark Office, "Supplemental Notice of Allowability", U.S. Appl. No. 15/399,611, dated Nov. 15, 2018, pp. 1-4, Published: US.

U.S. Patent and Trademark Office, "Notice of Allowance", U.S. Appl. No. 15/399,611, dated Feb. 13, 2019, pp. 1-11, Published: US.

United States Patent and Trademark Office, "Non-Final Office Action from U.S. Appl. No. 15/583,799 dated Feb. 13, 2019", pp. 1-28, Published in: US.

* cited by examiner

SYSTEMS AND METHODS FOR ICING RESISTANT TOTAL AIR TEMPERATURE PROBES

BACKGROUND

Total air temperature (TAT) measurements are used to properly control various aspects of aircraft operation and the engines that power the aircraft. One problem common in TAT probes in use today is that they are susceptible to icing which can interfere with TAT measurement accuracy. For example, the typical TAT probe comprises a leading edge air scoop that permits ice particles to enter and accumulate inside the probe. This ice accumulation can plug the device. Moreover, the concentration of the ice crystals that such probes are expected to handle without clogging is increasing, as reflecting to recent changes to icing regulations documented in SAE Aerospace Standards. One method for addressing the problem of icing on TAT probes is to heat the probe to melt the ice crystals as they are collected such that the resulting water can be expelled. However, under some circumstances melting or partial melting of the ice crystals may allow the resulting water to flow further within the probe and re-freeze. Moreover, wetting of the probe surface from melted ice can actually create regions on the probe where new ice crystals are more likely to stick rather than bounce off. In addition, the complex surface features found on probes today results in structures that are difficult to heat, or require exorbitant electrical power to remain heated to desired temperatures.

For the reasons stated above and for other reasons stated below which will become apparent to those skilled in the art upon reading and understanding the specification, there is a need in the art for system and methods for icing resistant total air temperature probes.

SUMMARY

The Embodiments of the present disclosure provide methods and systems for methods for icing resistant total air temperature probes and will be understood by reading and studying the following specification.

Systems and methods for icing resistant total air temperature probes are provided. In one embodiment, a total air temperature data probe comprises: a probe base; a probe body having a leading edge and a trailing edge and extending from the probe base along a first axis, the probe body comprising: a first interior airflow passage comprising a first annulus aligned with the first axis; a temperature sensor positioned within the first annulus; a heating element; a notched intake port positioned at a distal end of the probe body, wherein the probe body provides a conductive thermal path from the heating element to the notched intake port, the notch intake port including an open channel extending inward from a first face of the distal end into an intake aperture of the probe body, and a cutaway region that defines a recessed second face inset from the first face and exposes the open channel at least partially from the leading edge. The notched intake port further comprises a slot inset from the recessed second face that traverses across at least a portion of the intake aperture perpendicularly to the open channel.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical and electrical changes may be made without departing from the scope of the present disclosure. The following detailed description is, therefore, not to be taken in a limiting sense.

Embodiments of the present disclosure introduce an improved Total Air Temperature (TAT) probe that eliminates the forward facing scoops and associated airflow path through the probe. Instead, with embodiments of the present disclosure utilize a dorsal end having a notched tip that includes an opening to airflow passages that are normal to the direction of airflow across the probe during flight, thus eliminating direct ingestion of ice crystals into the probe. As explained in more detail below, these embodiments also allow for significantly simplified designs for providing heating to regions of the probe that require heating, which can also serve to simplify device manufacturing. In some embodiments, a TAT probe will further comprise an integrated ejector element which facilitates air flows through the probe for obtaining TAT measurements when the aircraft is on the ground.

Figure 1:
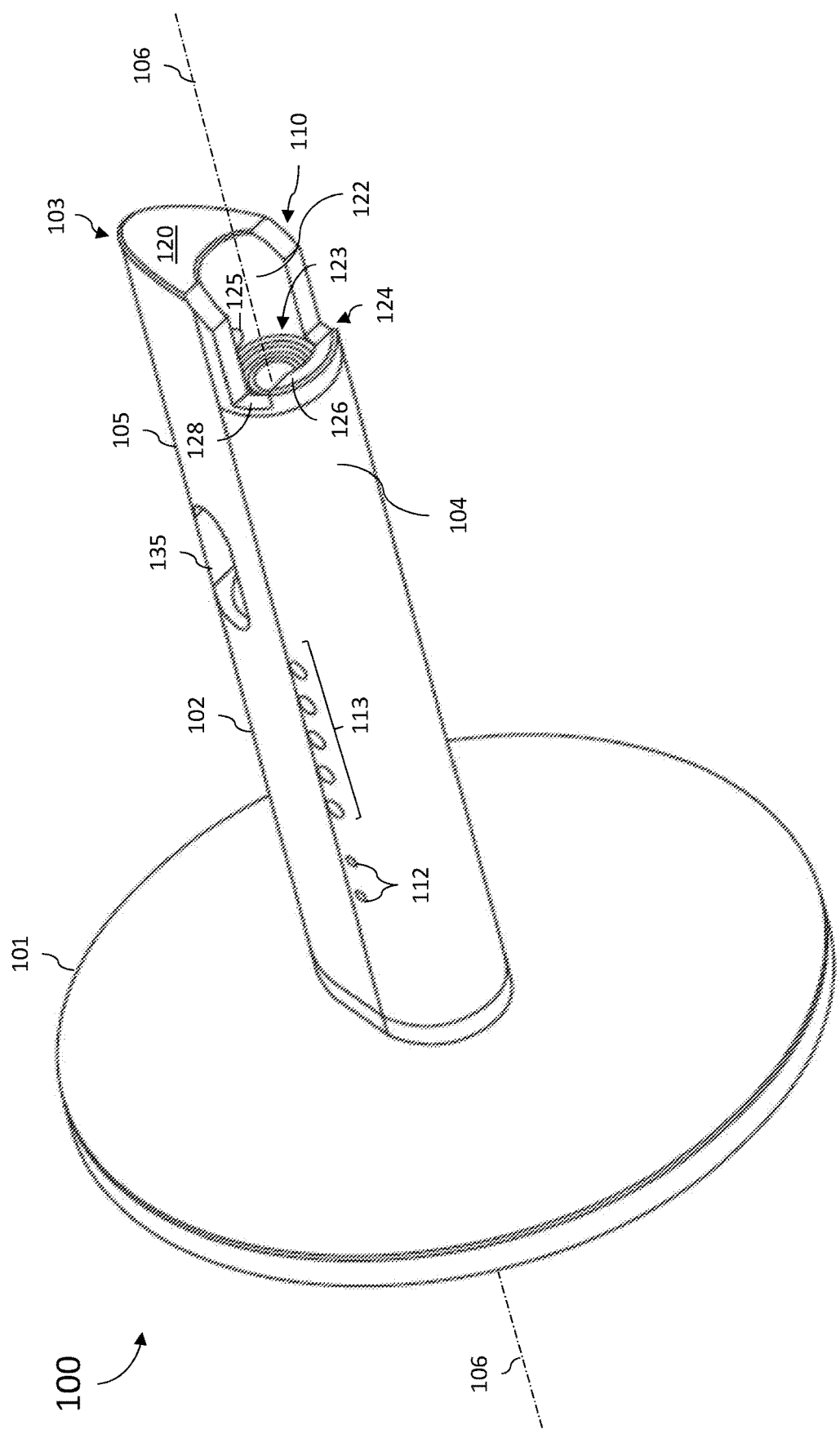
FIG. 1 is a diagram illustrating a total air temperature probe of one embodiment of the present disclosure.
Figure 2:
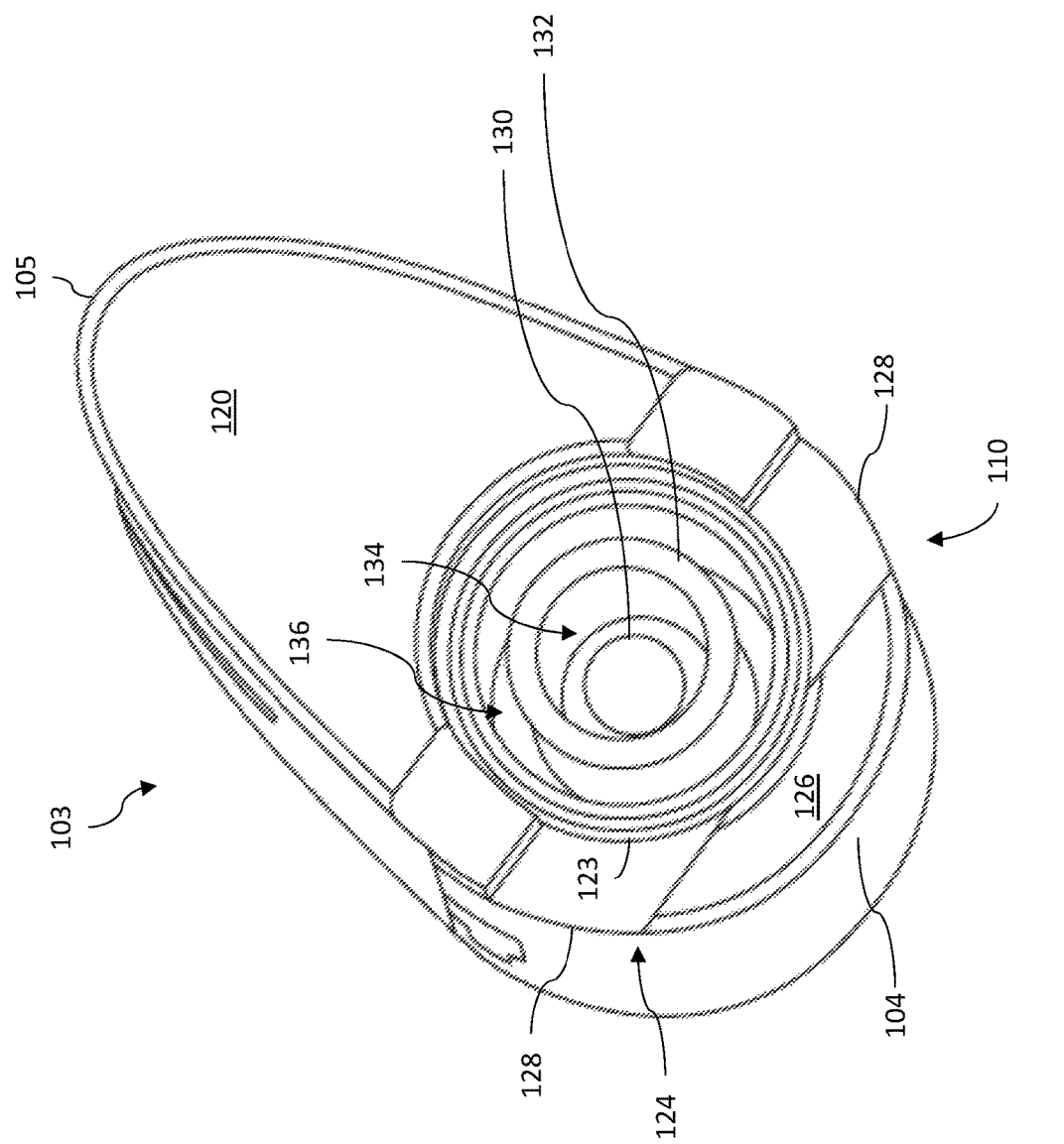
FIG. 2 is a diagram illustrating a notched intake port for a total air temperature probe of one embodiment of the present disclosure.
Figure 3:
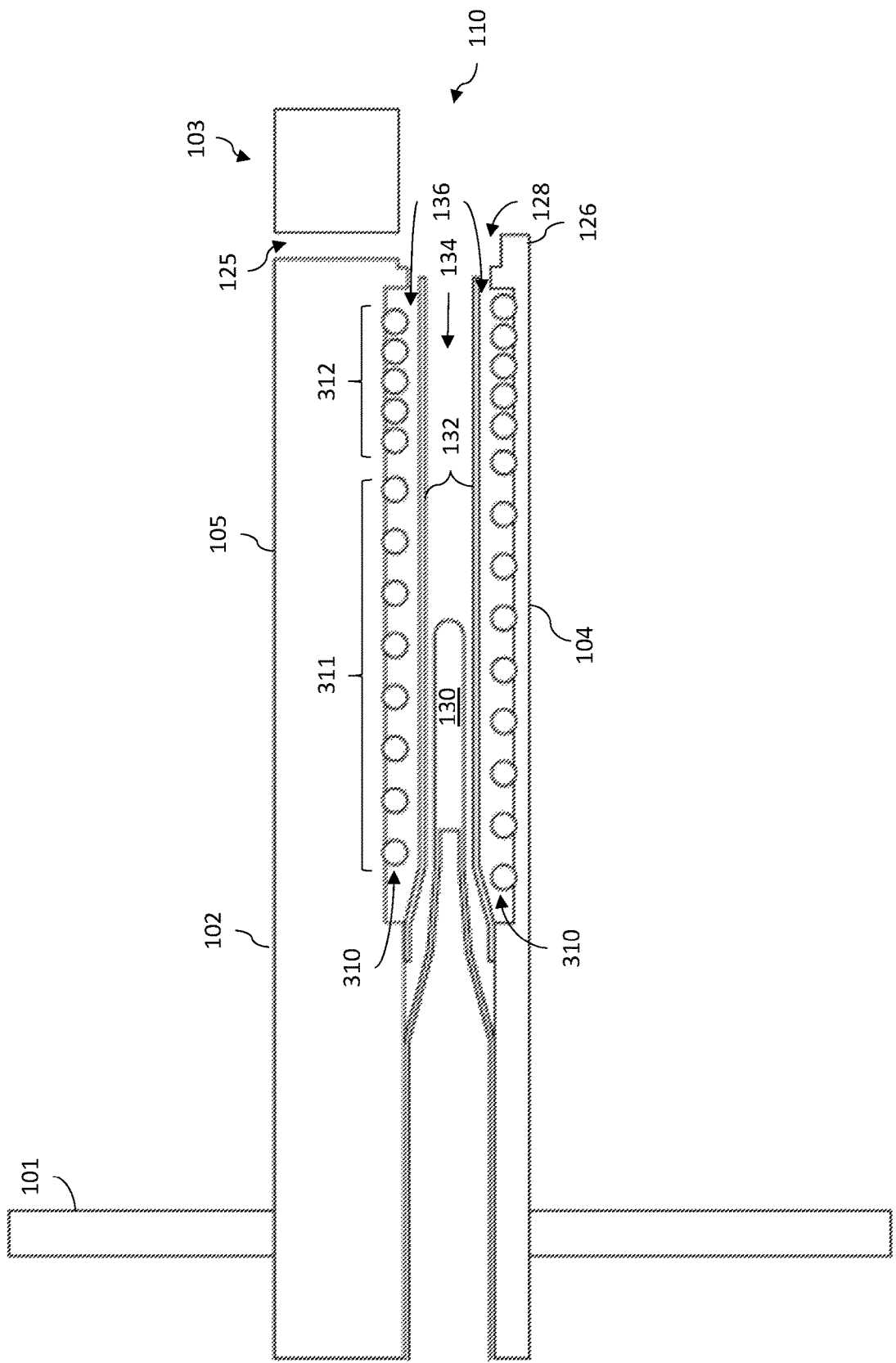
FIG. 3 is a cross-sectional diagram illustrating internal elements of a total air temperature probe of one embodiment of the present disclosure.

FIGS. 1 and 2 illustrating the surface profile for a TAT probe 100 of one embodiment of the present disclosure. Shown in FIG. 3 is a cross-sectional side view illustrating the internal elements of the TAT probe 100 illustrated in FIGS. 1 and 2.

TAT probe 100 comprises a base member 101 and a probe body 102 extending from the base member 101 along a first axis 106. In one embodiment the first axis 106 is aligned normal to a plane of the base member 101. Base member 101 is used to attach the TAT probe 100 to an aircraft fuselage or other surface of the aircraft and may therefore comprise one or more mounting or fastening features (such as, but not limited to a flange, screws, bolts, tabs, clasps, latches, and the like) known to those of skill in the art for mounting TAT probe 100 to the aircraft. In one embodiment, with TAT probe 100 mounted to an aircraft, a distal end 103 of probe body 102 protrudes away from the aircraft surface to which the base member 101 is mounted, so that it may extend into an airflow created when the aircraft is in flight. In some embodiments, TAT probe 100 is mounted to an aircraft surface that exposes probe body 102 to an airflow that passes around the air aircraft while in flight. Alternatively, in other embodiments, TAT probe 100 is mounted, for example, to or near an aircraft engine intake and exposed to an airflow that passes into that intake and through the engine. As shown in FIG. 1, probe body 102 further includes a leading edge 104 which defines the portion of the surface of probe body 102 that faces into the airflow when the aircraft is in flight, and a trailing edge 105 which defines the opposing back side of probe body 102 opposite to the leading edge 104. In alternate embodiments, the probe body 102 may be cylindrical, tapered, or of arbitrary shape.

In one embodiment, the probe body 102 is substantially fabricated from a mass metal or other material which is structured to comprise the various internal and external features described herein. With embodiments of the present disclosure, the distal end 103 comprises a notched intake port 110. The notched intake port 110 comprises an open channel 122 extending inward from a face 120 of the distal end 103 to feed air into an intake aperture 123 (discussed in more detail below). As shown in the figures, the notched intake port 110 further comprises a cutaway region that defines a recessed second face 124 that is inset from the first face, and exposes the open channel 122 at least partially to the leading edge 104. In this configuration, the open channel 122 runs parallel to the axis 106 of the probe body 102, and perpendicular to the direction of airflow. The notched intake port 110 further comprises a slot 128 inset from the recessed face 124 that traverses across at least a portion of the intake aperture 123 perpendicularly to the open channel 122, and is separated from the leading edge 104 by a lip 126. In one embodiment the face 120 of the distal end 103 is oriented normal to the probe axis 106 and/or is a flat surface without any trailing ridge.

In one embodiment with the aircraft in flight, air generally flows around the sides of the probe body 102 from the leading edge 104 towards the trailing edge 105, except where the air collides with the notched intake port 110. The notched intake port 110 is shaped to produce a standing vortex that drives a portion of the airflow down the open channel 122 into the intake aperture 123, and the balance around and/or over the probe body 102. The notched intake port 110 causes a buildup of total pressure in the open channel 122 as the velocity of the airflow colliding with the notched intake port 110 translates into a region of increased pressure, slowing down the air and changing the airflow from air having a static air temperature to air having a total air temperature. The combination of the region of increased pressure along with the vortex created by the slot 128 encourages ambient air that has not been heated by contact with the probe to enter the intake aperture 123, and, as further discussed below, drives ice crystals away from the notched intake port 110 to prevent their accumulation. In one embodiment, the open channel 122 of the notched intake port 110 further comprises a weep hole 125 that extends through the probe body 102 to the trailing edge 105 so that water from ice that melts within the notched intake port 110 can exit the notched intake port 110 rather than enter into the working regions of probe body 102. Weep hole 125 allows water and air to flow from the notched intake port 110 out the trailing edge of the probe. In some implementations, the probe body 102 may further include an additional aperture on the leading edge 104 for measuring total pressure.

It should be understood that the present disclosure uses the term "total air temperature" as that term would be understood by those of ordinary skill in the fields of aviation and fluid dynamics. That is, a total air temperature is a measurement of a stream of air if it were brought to rest relative to the aircraft. A total air temperature is distinguished from a static air temperature. More specifically, total air temperature differs from static air temperature as a function of the square of airflow velocity. This relationship may be expressed by Bernoulli's Equation. For example, air which has been slowed due to impacting with the nose of an inflight aircraft will have a higher temperature than air that is flowing without obstruction along the side of an aircraft. Conversion of static air temperatures into total temperature in a sense normalizes temperature measurements by accounting for differences in airflow velocities as temperature measurements are obtained.

Air flowing into the intake aperture 123 travels along a plurality of interior airflow passages. In one embodiment, a first airflow passage directs air entering intake aperture 123 through a first annulus 134, across a temperature sensor element 130, and then out of the probe body 102 from one or more exhaust ports 112. The first annulus 134 is formed between the sensor element 130 and a tubular heat shield 132 (as shown in FIG. 2), where the tubular heat shield 132 is open to the intake aperture 123 at its first end and where the temperature sensor element 130 is inserted into the tubular heat shield 132 at its second end. Air entering through the intake aperture 123 and into the first end of the tubular heat shield 132 thus flows over the temperature sensor element 130 before exiting the one or more exhaust ports 112. In one embodiment, the exhaust ports 112 are positioned along a side of the probe body 102 where the velocity of passing air causes the air pressure at the exhaust ports 112 to be less than the air pressure at the leading edge 104, or less than the air pressure at the intake aperture 123. In other embodiments, they may be positioned elsewhere such as but not limited to the trailing edge 105 side of probe body 102.

Temperature sensor element 130 comprises a device that outputs an electrical signal that varies as a function of sensed temperature. The raw electrical signal may be sampled or otherwise converted into data representing total air temperature measurements which may be provided to various onboard avionics for various purposes. In one embodiments, the TAT probe 100 includes a set of wires coupled to the temperature sensor element 130 that extend from the temperature sensor element 130 through the base member 101 so that the temperature sensor element 130 can be connected to the onboard avionics.

In one embodiment, tubular heat shield 132 comprises a sheath of insulating material that blocks heat radiated by probe body heating element from radiating to either the temperature sensor element or the air flow being measured. It should be noted that although heat shield 132 is described as being "tubular," this description should not be interpreted to infer that it necessarily has a round or circular cross-section. Heat shield 132 may be implemented as a sheath having any other cross sectional shape, and may vary in size along different portions of its length. For example, in one embodiment, the tubular heat shield 132 and the first annulus 134 which its interior defines, may vary in shape to follow a contour of the temperature sensor element 130.

In one embodiment, a second airflow passage directs air entering intake aperture 123 through a second annulus 136, across heating element 310 (shown in FIG. 3), and then out of the probe body 102 from one or more exhaust ports 113. In one embodiment, the exhaust ports 113 are positioned along a side of the probe body 102 where the velocity of passing air causes the air pressure at the exhaust ports 113 to less than the air pressure at the leading edge 104, or less than the air pressure at the intake aperture 123. In other embodiments, they may be positioned elsewhere such as but not limited to the trailing edge 105 side of probe body 102. The second annulus 136 is formed between the tubular heat shield 132 and an interior wall of the probe body 102 and as such defines a passage where air flow across the exterior of the tubular heat shield 132. Heating element 310 heats the air that passes through the second annulus 136, which heated internal airflow may be used to dissipate heat to keep various portions of the probe warm. Heating element 310 also conductively heats the thermal mass of the probe body 102 including the notched intake port 110. That is, the probe body 102 provides a conductive thermal path from the heating element 130 to the notched intake port 110. In alternate embodiments, heating element 310 may be a restive heating element comprising a wire, or cable, or film that is dissipates heat generated by the flow of electrical current. In some embodiments, the heating element 310 may take the form of a coil of material extending along the length of the second annulus 136. In other embodiments, the heating element may take the form of a cartridge inserted within the second annulus 136. In one embodiments, the TAT probe 100 includes a set of wires coupled to the heating element 310 that extend from the heating element 310 through the base member 101 so that the heating element 310 can be connected to onboard electrical power and control circuitry.

In the particular embodiment shown in FIG. 3, the heating element 310 comprises a continuous helix shaped coil wrapped around and in contact with the interior surface of probe body 102 that partial defines the second annual. In some implementations, the heating element 310 may be cast within the material of the probe body 102, or alternately routed through one or more slots machined into the material of the probe body 102. For example, during manufacturing the heating element 310 may be inserted into a slot or channel machined into the probe body 102 in the second annulus 136 and its power leads routed through the base member 101. The notched intake port 110 may then be installed into place and braised into a single piece with the probe body 102. The tubular heat shield 132 may be secured or stabilized within the probe body 102 by one or more standoffs that couple the tubular heat shield 132 to the probe body 102 to prevent shifting or rattling of the tubular heat shield 132, and/or to prevent tubular heat shield 132 from coming into contact with the heating element 310 or otherwise obstruct either the first or second interior airflow passages.

As indicated in FIG. 3, the heating element 310 may be non-uniformly wound or otherwise constructed to concentrate conductive heating to designated regions of the probe body 102. For example, in FIG. 3, the heating element 310 is wound with a relatively greater turn density (shown at 312) near the intake aperture 123 and with a relatively lesser turn density (shown at 311) further into the probe body 102. With this configuration, air entering the second annuals via intake aperture 123 can be more rapidly heated. Further, a greater density of heat is generated and delivered to the thermal mass of probe body 102 nearest the distal end 103 and the notched intake port 110 where ice crystal accumulation would be most detrimental to operation of TAT probe 100. Moreover, having a solid thermal mass of material at the notched intake port 110 facilitates both thermal conduction to the surface area of the tip as well as maintaining a high uniform temperature in that material. It should be noted that with the configuration shown in the embodiment of FIG. 3, the arrangement of the heating element 310 within the probe body 102 is relatively simple without the need for complex routing, while still being able to apply heat exactly where needed to ensure ice free operation of the probe 100. By specifically warming the notched intake port 110, accumulation of ice that would interfere with obtaining accurate total air temperature measurements is avoided. The perpendicular orientation of the notched intake port 110 with respect to the airflow experience by the TAT probe 100 with the aircraft inflight provides that a strong airflow will cause warmed and partially liquefied ice crystal accumulations (that is, warmed from contact with the heated probe body) to slide out of the open channel 122 and either over or around the distal end 103. Any ice crystals that might have been caught at the back of the open channel 122 due to the vortex created by slot 128 and the intake aperture 123, will melt from contact with the heated probe body and flow out weep hold 125. This dynamic keeps notched intake port 110 clear from ice buildup is illustrated in FIG. 4.

Figure 4:
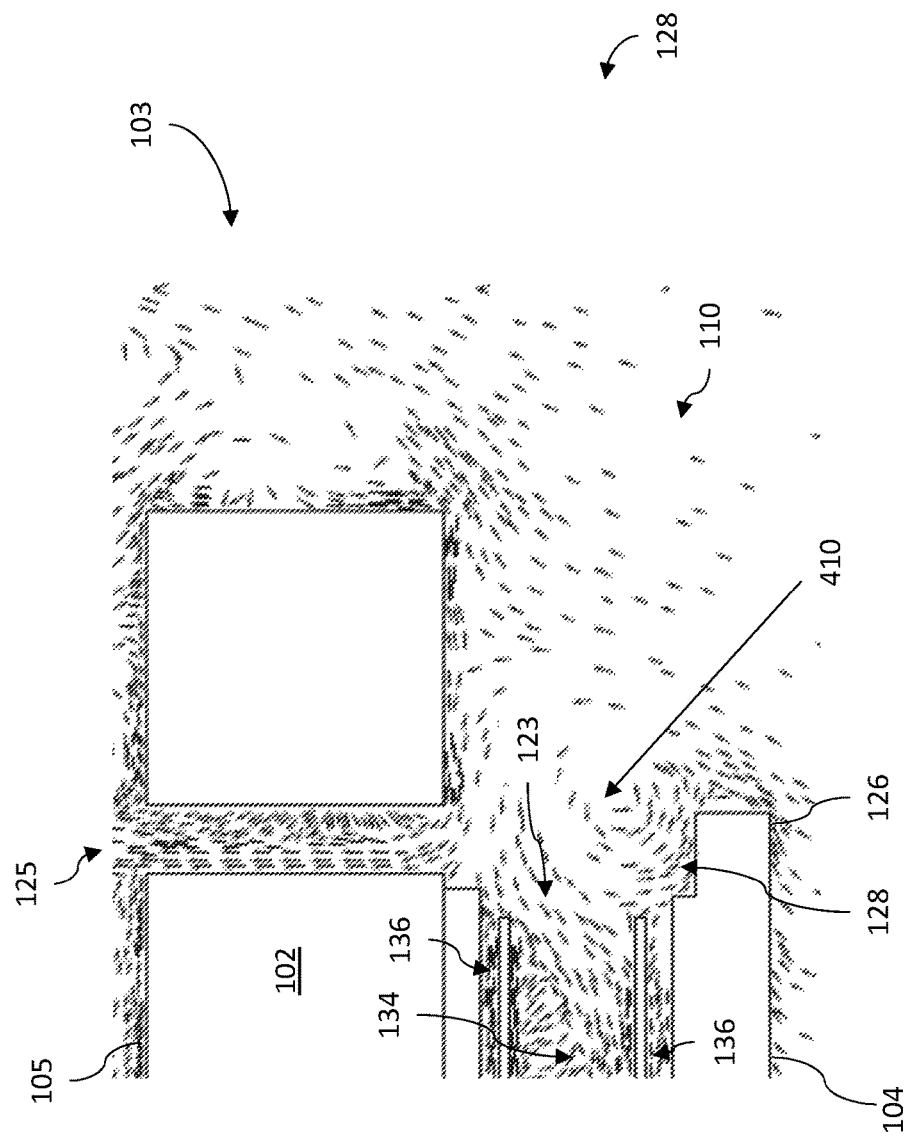
FIG. 4 is a diagram illustrating airflow during flight at a notched intake port of a total air temperature probe of one embodiment of the present disclosure.

FIG. 4 is a diagram illustrating at 400 airflow during flight at the notched intake port 110 and distal end 103 of probe body 102. The slot feature 128 in the notched intake port 110 converts the airflow that collides with the intake channel 122 into a stable vortex 410 and high pressure region immediately in front of the intake aperture 123. This serves to direct air into the intake aperture 123 and the first and second annuluses 134 and 136. In other words, unheated air is directed into annulus 134 by the stable vortex while air that is partially heated by contact with the probe body 102 is drawn into annulus 136. This prevents the heated air from entering at annulus 134, enhancing the ability to measure the proper total temperature of the air with this probe 100. As mentioned above, slot feature 128 is oriented perpendicular to the to the in-flight airflow direction (i.e., normal to the plane that intersects the leading edge 104 and trailing edge 105). In one embodiment, the slot feature 128 is cut into the recessed second face 124 to traverse across approximately 20%-50% of the area of the intake aperture 123. As evident from FIG. 4, the distal end 103 of the probe body does not include a number of thin metal elements that quickly dissipate heat and therefore require considerable energy to be kept at a desired temperature to dissuade ice crystal build up. If ice begins to accumulate, the natural airflow from the aircraft in flight can force it off of the notched intake port 110 without the ice crystals needing to travel through the internal annuluses 134 or 136 of the probe body 102.

Figure 5:
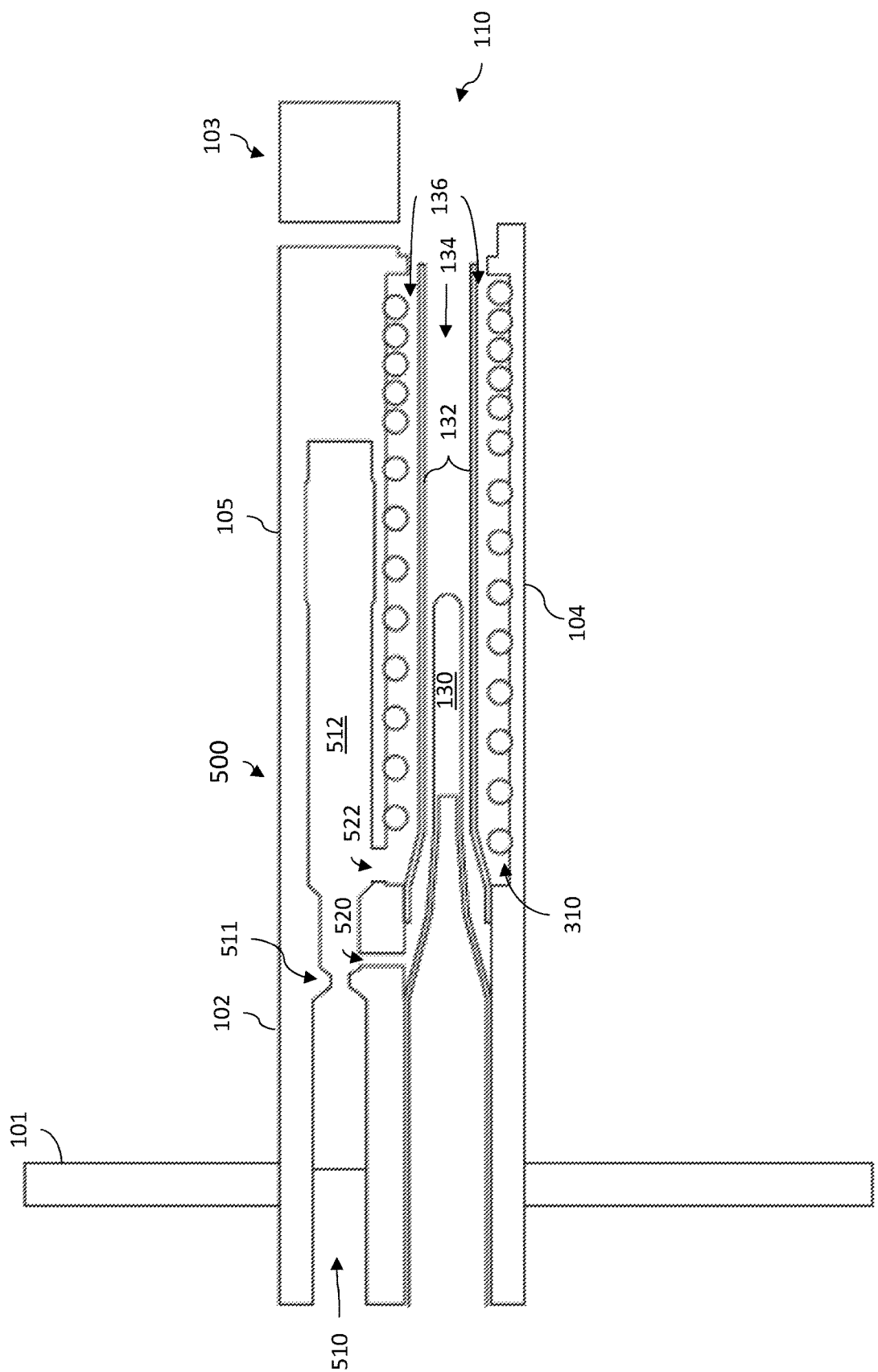
FIG. 5 is a cross-sectional diagram illustrating internal elements of another total air temperature probe of one embodiment of the present disclosure.

The present disclosure as so far focused on embodiments and operation of a TAT probe 100 with respect to an aircraft in-flight. However, it would be readily appreciate that icing of an aircraft's sensors can also occur and be problematic for on-ground aircraft, such as aircraft awaiting takeoff. During flight, the notched intake port 110 generates a high pressure region in front of the intake aperture 123. This, together with low pressure regions created at exhaust ports 112 and 113, creates a natural airflow through the first and second annuluses 134 and 136. With the aircraft on the ground, however, no such natural airflow occurs. Accordingly, in some embodiments, the TAT probe 100 may optionally further comprise an air ejector such as shown generally at 500 in the cross-sectional illustration in FIG. 5. The air ejector 500 includes an ejector inlet 510, a low pressure ejector chamber 512, and at least one ejector exhaust port (shown at 135 in FIG. 1). It should be appreciated that in alternate embodiments, the ejector flow can be exhausted through vents on the probe tip 103, trailing edge 105, and/or the side (as illustrated in FIG. 1). A first ejector secondary inlet 520 open the innermost end of the first annulus 134 to the low pressure ejector chamber 512. A second ejector secondary inlet 522 open the innermost end of the second annulus 136 to the low pressure ejector chamber 512. An alternate approach would be an embodiment that combines secondary inlets 520 and 522. This could be accomplished by attaching heat shield 132 to probe body 102 with standoffs at both ends of the shield. This would allow the airflow passing through annuluses 134 and 136 to re-combine before entering the ejector 500. In the particular embodiment illustrated in FIG. 5, the ejector 500 is located in the trailing edge of the probe body 102 and runs parallel to the probe axis 106.

When the ejector 500 is activated, a high pressure airflow is applied to the ejector inlet port 510 and passes through a flow restrictor 511 that couples the ejector inlet port 510 to the low pressure ejector chamber 512. Flow restrictor 511 drops the pressure of the ejector airflow entering the low pressure ejector chamber 512 which in turn draws in air from the first annulus 134 via the first secondary inlet 520, and draws in air from the second annulus 136 via the second secondary inlet 522. These three combined airflows are ejected together through from the ejector exhaust port 135. Air is pulled into the intake aperture 123 through both the first and second annulus 136 as the low air pressure in the chamber 512 created by the high pressure airflow from the ejector inlet port 510 passing through the flow restrictor 511 draws air in from the first and second ejector secondary inlet ports 520 and 522. This results in the creation of airflows through the first and second annuluses 134 and 136 even when the probe body 102 is not provide a natural airflow from being in flight. The ejector generated airflows serve the dual purpose of allowing the TAT probe 100 to operate on-ground by drawing air across the sensor element 130 so that TAT data can be obtained, while also drawing in air to keep the TAT probe 100 from overheating with the aircraft stationary and/or on the ground. Thus, with the ejector 500 in operation, TAT probe 100 can be energized and kept warm enough to prevent icing so that TAT data can still be obtained.

Example Embodiments

Example 1 includes a total air temperature data probe, the probe comprising: a probe base; and a probe body having a leading edge and a trailing edge and extending from the probe base along a first axis, the probe body comprising: a first interior airflow passage comprising a first annulus aligned with the first axis; a temperature sensor positioned within the first annulus; a heating element; a notched intake port positioned at a distal end of the probe body, wherein the probe body provides a conductive thermal path from the heating element to the notched intake port, the notched intake port including an open channel extending inward from a first face of the distal end into an intake aperture of the probe body, and a cutaway region that defines a recessed second face inset from the first face and exposes the open channel at least partially from the leading edge; and wherein the notched intake port further comprises a slot inset from the recessed second face that traverses across at least a portion of the intake aperture perpendicularly to the open channel.

Example 2 includes the probe of example 1, wherein the open channel runs parallel to the axis of the probe body.

Example 3 includes the probe of any of examples 1-2, wherein the slot is separated from the leading edge by a lip.

Example 4 includes the probe of any of examples 1-3, wherein the first face of the distal end is flat and oriented normal to the probe axis.

Example 5 includes the probe of any of examples 1-4, further comprising a weep hole penetrating from a base of the notched intake port to the trailing edge of the probe body.

Example 6 includes the probe of any of examples 1-5, the probe body further comprising: a second interior airflow passage comprising a second annulus aligned with the first axis; and a tubular heat shield; wherein the second annulus is defined by a space between the tubular heat shield and an interior wall of the probe body and the tubular heat shield separates the first annulus from the second annulus.

Example 7 includes the probe of example 6, wherein the heating element is positioned within the second annulus.

Example 8 includes the probe of any of examples 6-7 wherein the intake aperture opens to both the first annulus and the second annulus.

Example 9 includes the probe of any of examples 6-8, wherein the first interior airflow passage and the second interior air-flow passage are concentric tubular air passages.

Example 10 includes the probe of any of examples 6-9, the probe body further comprising an air ejector, the air ejector comprising: an ejector inlet coupled to an aircraft provided pressurized air supply; a low pressure chamber coupled to the ejector inlet through a flow restrictor; and at least one ejector exhaust port; wherein when the aircraft provided pressurized air supply is applied to the ejector inlet, the low pressure chamber pulls an airflow through the first annulus and the second annulus, and ejects the airflow from the probe body through the at least one ejector exhaust port.

Example 11 includes the probe of example 10, wherein the air ejector is aligned with the first axis.

Example 12 includes the probe of any of examples 1-11, further comprising a plurality of exhaust ports positioned along a side of the probe body.

Example 13 includes the probe of any of examples 1-12, wherein the heating element comprises a wire, a cable, or a film.

Example 14 includes the probe of any of examples 1-13, wherein the heating element comprises a cartridge inserted within the second annulus.

Example 15 includes the probe of any of examples 1-14, wherein the heating element is non-uniformly constructed to concentrate conductive heating to designated regions of the probe body.

Example 16 includes a method for a total air temperature data probe, the method comprising: creating an airflow through a first annulus and a second annulus of a probe body, the probe body comprising a leading edge and a trailing edge; directing the airflow through the first annulus and the second annulus from a notched intake port positioned at a distal end of the probe body, the notched intake port including an open channel extending inward from a first face of the distal end into an intake aperture of the probe body, and a cutaway region that defines a recessed second face inset from the first face and exposes the open channel at least partially from the leading edge, wherein the intake aperture opens to both the first annulus and the second annulus; directing a first portion of the airflow passing through the first annulus across a temperature sensor positioned within the first annulus; heating a second portion of the airflow passing through the second annulus with a heating element located within the second annulus; and exhausting the airflow from the probe body.

Example 17 includes the method of example 16, further comprising obtaining a total air temperature measurement from the temperature sensor.

Example 18 includes the method of any of examples 16-17, wherein the probe body provides a conductive thermal path from the heating element to the notched intake port.

Example 19 includes the method of any of examples 16-18, the probe body further comprising a tubular heat shield; wherein the second annulus is defined by a space between the tubular heat shield and an interior wall of the probe body and the tubular heat shield separates the first annulus from the second annulus.

Example 20 includes the method of any of examples 16-19, wherein creating the airflow through the first annulus and the second annulus of the probe body comprises: operating an air ejector within the probe body, the air ejector comprising: an ejector inlet coupled to an aircraft provided pressurized air supply; a low pressure chamber coupled to the ejector inlet through a flow restrictor; and at least one ejector exhaust port; wherein when the aircraft provided pressurized air supply is applied to the ejector inlet, the low pressure chamber pulls the airflow through the first annulus and the second annulus, and ejects the airflow from the probe body through the at least one ejector exhaust port.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A total air temperature data probe, the probe comprising:
    a probe base; and
    a probe body having a leading edge and a trailing edge and extending from the probe base along a first axis, the probe body comprising:
        a first interior airflow passage comprising a first annulus aligned with the first axis;
        a second interior airflow passage comprising a second annulus aligned with the first axis; and
        a tubular heat shield separating the first annulus from the second annulus;
        wherein the second annulus is defined by a space between the tubular heat shield and an interior wall of the probe body;
        a temperature sensor positioned within the first annulus;
        a heating element positioned within the second annulus;
        a notched intake port positioned at a distal end of the probe body,
    wherein the probe body provides a conductive thermal path from the heating element to the notched intake port, the notched intake port including an open channel extending inward from a first face of the distal end into an intake aperture of the probe body opening to both the first annulus and the second annulus, and a cutaway region that defines a recessed second face inset from the first face and exposes the open channel at least partially from the leading edge; and
    wherein the notched intake port further comprises a slot inset from the recessed second face that traverses across at least a portion of the intake aperture perpendicularly to the open channel.

2. The probe of claim 1, wherein the open channel runs parallel to the axis of the probe body.

3. The probe of claim 1, wherein the slot is separated from the leading edge by a lip.

4. The probe of claim 1, wherein the first face of the distal end is flat and oriented normal to the probe axis.

5. The probe of claim 1, further comprising a weep hole penetrating from a base of the notched intake port to the trailing edge of the probe body.

6. The probe of claim 1, wherein the first interior airflow passage and the second interior air-flow passage are concentric tubular air passages.

7. The probe of claim 1, the probe body further comprising an air ejector, the air ejector comprising:
    an ejector inlet coupled to an aircraft provided pressurized air supply;
    a low pressure chamber coupled to the ejector inlet through a flow restrictor; and
    at least one ejector exhaust port;
    wherein when the aircraft provided pressurized air supply is applied to the ejector inlet, the low pressure chamber pulls an airflow through the first annulus and the second annulus, and ejects the airflow from the probe body through the at least one ejector exhaust port.

8. The probe of claim 7, wherein the air ejector is aligned with the first axis.

9. The probe of claim 1, further comprising a plurality of exhaust ports positioned along a side of the probe body.

10. The probe of claim 1, wherein the heating element comprises a wire, a cable, or a film.

11. The probe of claim 1, wherein the heating element comprises a cartridge inserted within the second annulus.

12. The probe of claim 1, wherein the heating element is non-uniformly constructed to concentrate conductive heating to designated regions of the probe body.

13. A method for a total air temperature data probe, the method comprising:
    creating an airflow through a first annulus and a second annulus of a probe body, the probe body comprising a leading edge and a trailing edge;
    directing the airflow through the first annulus and the second annulus from a notched intake port positioned at a distal end of the probe body, the notched intake port including an open channel extending inward from a first face of the distal end into an intake aperture of the probe body, and a cutaway region that defines a recessed second face inset from the first face and exposes the open channel at least partially from the leading edge, wherein the intake aperture opens to both the first annulus and the second annulus;
    directing a first portion of the airflow passing through the first annulus across a temperature sensor positioned within the first annulus;
    heating a second portion of the airflow passing through the second annulus with a heating element located within the second annulus; and
    exhausting the airflow from the probe body;
    wherein the probe body further comprises a tubular heat shield, wherein the second annulus is defined by a space between the tubular heat shield and an interior wall of the probe body and the tubular heat shield separates the first annulus from the second annulus.

14. The method of claim 13, further comprising obtaining a total air temperature measurement from the temperature sensor.

15. The method of claim 13, wherein the probe body provides a conductive thermal path from the heating element to the notched intake port.

16. The method of claim 13, wherein creating the airflow through the first annulus and the second annulus of the probe body comprises:
- operating an air ejector within the probe body, the air ejector comprising:
- an ejector inlet coupled to an aircraft provided pressurized air supply;
- a low pressure chamber coupled to the ejector inlet through a flow restrictor; and
- at least one ejector exhaust port;
- wherein when the aircraft provided pressurized air supply is applied to the ejector inlet, the low pressure chamber pulls the airflow through the first annulus and the second annulus, and ejects the airflow from the probe body through the at least one ejector exhaust port.

* * * * *